United States Patent [19]

Falkinger et al.

[11] 4,078,674

[45] Mar. 14, 1978

[54] APPARATUS FOR MANUFACTURE OF SHEETS OR BOARD UNITS FROM CELLULOSE OR FIBRE MATERIAL OR SHAVINGS

[75] Inventors: Willard Falkinger, Farsta; Per Anders Asberg, Taby, both of Sweden

[73] Assignee: Defibrator Aktiebolag, Stockholm, Sweden

[21] Appl. No.: 623,532

[22] Filed: Oct. 17, 1975

[30] Foreign Application Priority Data

Oct. 23, 1974 Sweden .............................. 74133448

[51] Int. Cl.[2] .................................................. B29C 3/00

[52] U.S. Cl. ............................... 214/16.4 R; 425/338; 214/16.6

[58] Field of Search ................... 100/196; 214/16.4 R, 214/16.6; 425/338

[56] References Cited

U.S. PATENT DOCUMENTS

| | | | |
|---|---|---|---|
| 2,704,608 | 3/1955 | Graf et al. | 214/16.6 |
| 2,775,787 | 1/1957 | Krag | 425/338 X |
| 3,077,271 | 2/1963 | Siempelkamp | 214/16.6 |
| 3,268,642 | 8/1966 | Hutter | 425/338 X |
| 3,389,652 | 6/1968 | Bruder et al. | 100/137 |
| 3,860,381 | 1/1975 | Pesch | 425/338 |

*Primary Examiner*—Trygve M. Blix
*Assistant Examiner*—R. B. Johnson
*Attorney, Agent, or Firm*—Eric Y. Munson

[57] ABSTRACT

Apparatus for producing pressed board and the like in a tiered multi-opening press in which the blank supporting conveyor plates are moved successively between the loading end and the discharge end along a substantially rectangular split-level track pattern in which the longer side portions are located at a level different from that of the two shorter side portions. The loaded plates are introduced into the press at the level of the side portions and at the discharge end are moved to the level of the shorter end portions and conveyed transversely to the opposite corner of the rectangular track where they are again moved to the level of the side portions and conveyed at this level to the opposite corner where in turn they are moved to the level of the shorter end portions and conveyed transversely to the opposite corner and moved to the level of the side portions where they are re-loaded and re-conveyed to the press.

5 Claims, 6 Drawing Figures

APPARATUS FOR MANUFACTURE OF SHEETS OR BOARD UNITS FROM CELLULOSE OR FIBRE MATERIAL OR SHAVINGS

BACKGROUND OF THE INVENTION

This invention relates to an apparatus for the manufacture of sheets or board units from cellulose or fibrous material or wood shavings and comprises a multi opening press for accommodating one or several press plates between which wet sheets or dry sheets supported by the plates or wire cloth frames are subjected to pressure and heat treatment, a conveyor track defining a closed circuit for returning the plates or frames from the discharge side of the press to the feed side thereof and elevator members for displacing the plates or frames in vertical direction between the conveyor track and the compartments located on different levels of the multi opening press or between the compartments and the conveyor track.

In the manufacture of sheets or board units by means of an apparatus of the kind described above it is of greatest importance to maintain a high feeding speed throughout the operation in order to produce the greatest possible number of sheets or board units per unit time. In the use of known apparatuses some delay is experienced in the feeding and discharge of the conveyor or surface plates or frames to or from the elevator members. This is due to the fact that the conveyor track which usually has a rectangular pattern is located in a single plane. Therefore, in order to avoid collision between the plates or frames at the corners of the rectangular track, where they reverse their direction of travel, it becomes necessary to remove the plate or frame entirely before the entrance of a successive plate or frame into the corner. The delay experienced at the respective corner inplies that the respective plate or frame must be moved a distance equal to the width or length of the plate or frame.

SUMMARY OF THE INVENTION

One main object of the invention is to provide an apparatus of the kind defined above which eliminates the delay at the corners of the conveyor track so that the plates or frames can be advanced continuously without interference. This object is attained according to one main feature of the invention, by disposing ahead of and behind the elevator members of the apparatus one or several conveyor mechanisms for vertically displacing the plates or frames in such a manner that two plates or frames are displaced simultaneously in two planes directly above one another but in different directions.

Further objects, features and advantages of the invention will become apparent from the following description of a preferred embodiment with reference to the accompanying drawings, which form part of this specification and of which:

DESCRIPTION OF A PREFERRED EMBODIMENT

Figure 1:
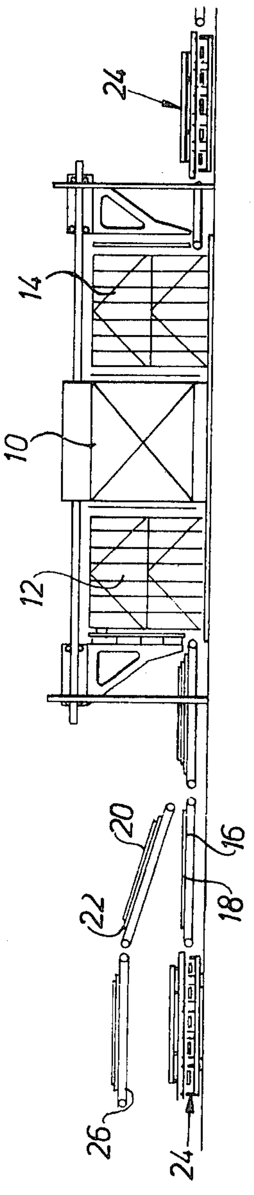
FIG. 1 is a side elevation of a multi opening press with associated feed devices, including the novel apparatus constructed according to the invention.

The same or corresponding details shown in the various figures have been denoted by the same reference numerals.

Figure 2:
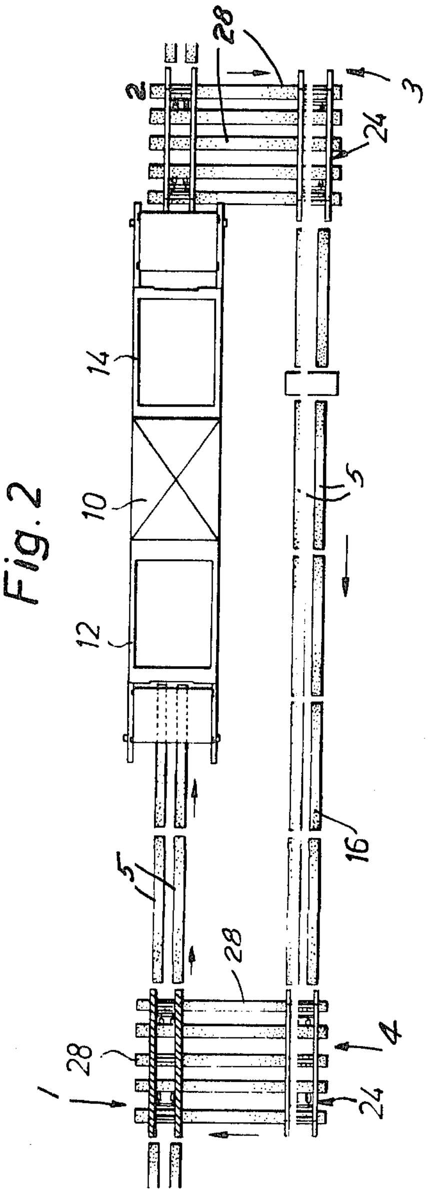
FIG. 2 is a top plan view of the multi opening press arrangement illustrated in FIG. 1.

The apparatus illustrated in FIGS. 1 and 2 comprises a multi opening press 10 with associated elevator members 12 and 14 mounted adjacent the repsective feeding and discharge side, of the press. The apparatus further comprises a conveyor track 16 which extends in a rectangular pattern, so that conveyor plates 18 which are unloaded at the discharge side can be returned to the loading side to be reloaded with sheets 20. If desired, a wire cloth 22 may be interposed between the sheets and the plates. The sheets 20 together with their wire cloths 22 are conveyed on an upper conveyor track 26 which converges with the conveyor track 16 so that the sheets 20 and the wire cloths 22 in a manner known per se are successively deposited onto their supporting plates 18 which plates are fed separately into the lower conveyor tract 16. Disposed at the four corners of the rectangular track 16 are devices 24 constructed according to the invention (see especially FIGS. 3–6) for lifting or lowering, the plates 18. The arrows shown in FIG. 2 beside the conveyor track 16 indicate the direction of travel.

In the specific embodiment represented in FIG. 2, the upper lefthand corner, indicated generally by reference numeral 1, and the lower righthand corner of the rectangular conveyor track 16 comprise conveyor mechanisms 24 which are designed to lift conveyor plates 18 from a lower lever represented by the conveyors 28 to an upper level, represented by the conveyors 5, whereas the upper righthand corner K indicated generally by the reference numerals, and the lower lefthand corner, indicated generally by the reference numeral 4, of the track 16 comprise conveyor mechanisms designed to lower the conveyor plates from the upper to the lower level. All mechanisms 24 are exactly the same but operate in opposite sequence in response to operation to be effected at the corner in consideration. Thus, the mechanisms 24 lower the plates in one corner and raise them in the directly opposite corner.

Figure 3:
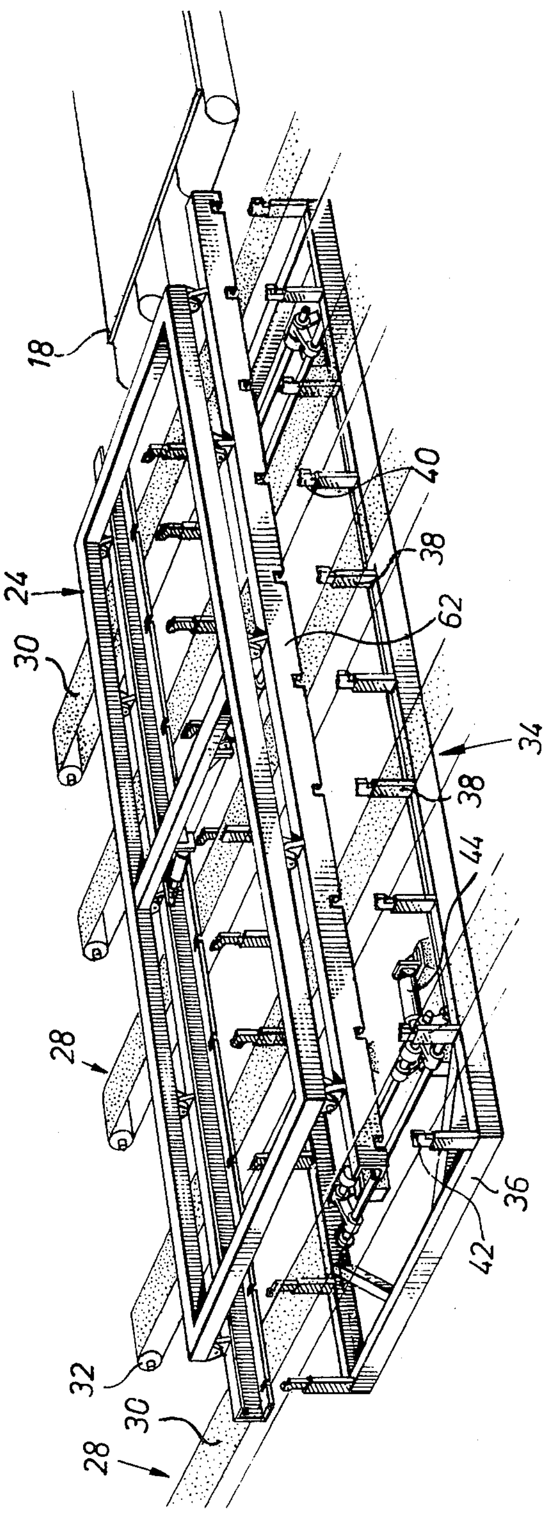
FIG. 3 is a perspective view of the novel mechanism together with plate feeding conveyors and discharge members.
Figure 4:
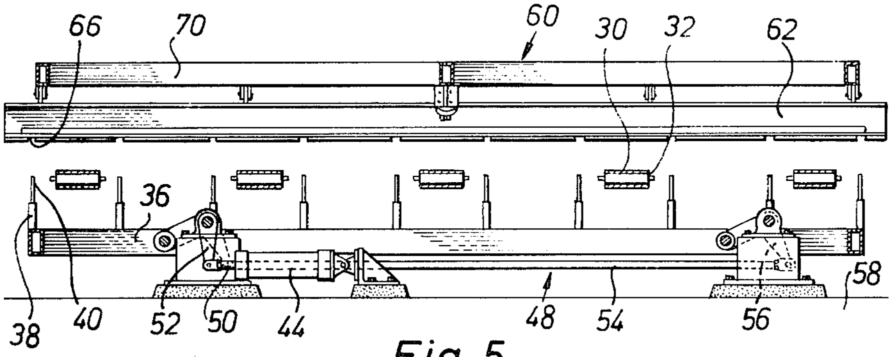
FIG. 4 is a side elevation of the novel mechanism in a lowered working position.
Figure 5:
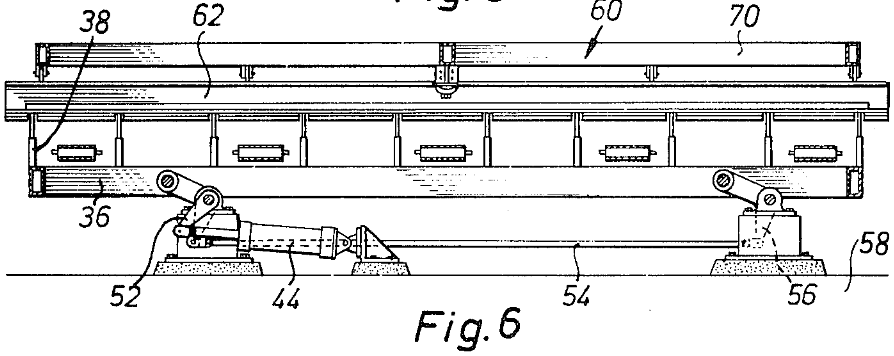
FIG. 5 is a lateral view of the novel mechanism in a raised working position.

FIG. 3 shows the novel conveyor mechanism 24 in more detail, it being assumed that the mechanism is placed ahead of the elevator member 12 of the multi opening press and designed to lift a conveyor plate 18 from the lower to the upper level, i.e., at the corners 1 and 3. Five plate feeding conveyors arranged in parallel are shown, and they feed the plates 18 into the mechanism 24. Each conveyor 28 comprises a conveyor belt 30 with associated pulleys. For the sake of clarity one pulley 32 only is shown for each conveyor belt 30. The discharge of the conveyor plates 18 from the conveyor mechanism 24 is indicated diagrammatically to the right in FIG. 3.

A lifting and lowering device 34 forming part of the mechanism 24 comprises a square-shaped frame 36 designed for a lifting or lowering operation. This frame along its two longitudinal sides is equipped with upstanding support bars 38. The upper portion 40 of each support bar 38 is formed with an outer shoulder 42 which projects laterally from the frame 36 and forms part of the upper portion 40 of the support bar 38. The spacing between support bars 38 which are located opposite to one another along the longitudinal sides of the frame 36 is dimensioned so that a conveyor plate 18 can be brought to bear against the support bars 38 between the outwardly projecting shoulders 42 on both sides of the frame 36. The shoulders 42 will thus project upwards outside and beyond the longitudinal edge of the plate 18 providing a slight gap between the longitudinal edges of the plate 18 and the shoulders 42. The frame 36 together with the associated support bars 38 together with a servo motor 44 equipped with a driving piston 50 and a linkage 48 constitutes a jack system.

On actuation of the driving piston 50 a crank arm 52 in the linkage 48 is brought to such a position that one end of the frame 36 is raised. Since the crank arm 52 illustrated to the left in FIGS. 4 and 5 through a link bar 54 is connected with a crank arm 56 arranged to the right in the same Figure, the action of the piston 50 is transmitted also to the other end of the frame 36 so that the whole frame 36 is raised parallel to a stationary bed 58. Provided above of the frame 36 is a supporting device 60 comprising two mutually parallel supports 62 having the shape of channel bars which are disposed over the two rows of support bars 38, the open portions of the channel bars 62 substantially facing one another. Due to the fact that the lower shanks 64 of the channel bars 62 are formed with recesses 66 matching the upper portions 40 of the support bars 38, the support bars 38 can be displaced without any obstruction so that the supporting portions 40 of the same will reach the same level as the upper surfaces of the lower shanks 64 of the channel bars 62. The channel bars 62 are pivotably arranged in a stationary stand 70 connected to the supporting device 60. Due to the fact that the pivot centres 72 of the channel bars 62 are disposed higher up than the upper ends of the support bars 38, the channel bars can be swung outward and upward the bars 62 is effected in a combined outward and upward. Servo motors 76 equipped with driving pistons 74 are provided to bring about the pivotal movement of the channel bars 62 to the desired position. This movement is best understood from FIG. 6.

Figure 6:
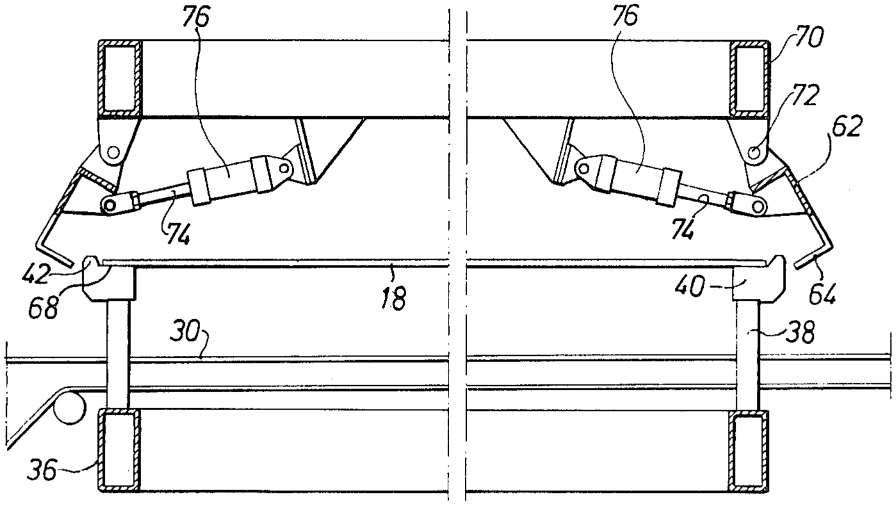
FIG. 6 is a cross-sectional view of the novel mechanism with one conveyor plate positioned therein.

As shown in FIG. 6, a conveyor plate 18 rests on the support surfaces 68 of the support bars 38. On actuation by the driving pistons 74 of the servo motors 76 the channel bars 62 have been swung out. The plate 18 now takes such a position that the channel bars 62 can be returned so that its lower shanks 64 will catch the conveyor plate 18 from below to support the same. Thereupon the frame 36 with the support bars 38 can again be lowered. This makes it possible for power source (not shown) to move the conveyor plate 18 resting on the supporting shanks 64 onto the upper level of the conveyor track 16. At the same time it is also possible to move in transverse direction a subsequent conveyor plate or wire frame into position to be lifted to the upper level of the conveyor track 16. In this way a continuous feed of the plates 18 can be effected in various directions directly above one another. In operation of the embodiment described, the sheet supporting plates 18 move continuously between the loading end and the discharge end of the conventional press means 12, 10 and 14, along a rectangular track. At the discharge end, the plates 18 are successively lowered at the corner 2 by the mechanism 24 and moved transversely by conveyors 28 to the corner 3, where the plates are lifted by the mechanism 24 to the level 5 and transported to the corner 4, where they are again lowered to make room for successive plates and then moved transversely to the corner 1, where they are again raised by the mechanism 24 to the level 5 of the rectangular track and re-loaded and re-conveyed to the press.

It should be obvious to any person skilled in the art that the mechanism 24 can also be utilized for lowering a conveyor plate 18 from an upper to a lower level, thus reversing the sequence of operations.

In the preferred embodiment shown in the drawing, the lower shanks 64 of the channel bars 62 are utilized as sliding surfaces on which a conveyor plate 18 can be brought to slide in horizontal direction. However, it is possible also to utilize rolls arranged on said shank 64 on which rolls the conveyor plates 18 are supported. In this way the moving of the plate 18 in horizontal direction is simplified.

While one more or less specific embodiment of the invention has been shown and described, it is to be understood that this is for purpose of illustration only, and that the invention is not to be limited thereby, but its scope is to be determined by the appended claim.

What is claimed is:

1. In an apparatus for producing pressed board and the like in a tiered multi-opening press in which the board blanks are deposited individually on conveyor plates which are moved successively at predetermined intervals in a rectangular pattern between the feed-in end and the discharge end of the press, the improvement which allows the plates to proceed continuously without retardation at the corners of the pattern, comprising:

a. a rectangular conveyor track (16) having its two parallel feed-in and return portions located at a level different from the level of the transverse end portions;
b. means (24) for displacing the successive plates at the corners of said rectangular conveyor track from one level to the other, and
c. means for moving said displaced plates transversely from one corner to the opposite corner;
d. said conveyor means (24) comprises a supporting device (60) on which the plates (18) are displaceable in horizontal direction into the conveyor means (24) or out of the same,
e. a lifting and lowering means (34) being located beneath said conveyor means by which the plates (18) are displaceable in a vertical direction between the supporting device (60) and said conveyor track (16),
f. said lifting and lowering means (35) as well as the supporting device (60) being adapted to be actuated by servo motors (44 or 76), respectively, and said supporting device comprising two pivotable lateral supports (62) for supporting a plate to catch two of the opposite lateral edges thereof from below.

2. The apparatus as claimed in claim 1, in which the lateral supports (62) are pivotably fixed onto a stationary supporting frame (70) disposed above said supports, a servo motor (76) being disposed between the supporting frame (70) and the associated lateral supports (62) to impart to said lateral supports (62) a pivoting movement so that a plate (18) is engaged or released.

3. The apparatus as claimed in claim 1 in which the lifting and lowering means (34) is driven by a servo motor (44) to lift and lower said device in relation to a stationary bed (58).

4. The apparatus as claimed in claim 1, in which the lifting and lowering means (34) is equipped with vertically directed support bars provided at their upper ends with supporting surfaces (68) to catch from below and retain a plate (18) at the opposed lateral edges thereof during the displacement in vertical direction, the upper portion (40) of each support bar (38) being formed with a projecting lateral shoulder (42) which shoulders (42) project upwards outside of the opposed lateral edges of the plate (18) to prevent lateral displacements of the same during the displacement thereof.

5. The apparatus as claimed in claim 4, in which the supporting bars (38) are displaceable between a level below the lower level of the conveyor track (16) and a level on which the supporting surfaces (68) of the same coincide with the supporting surfaces of the lateral supports (62), the lateral supports (62) being formed with recesses (66) fitting each to the associated supporting bars (38).

* * * * *